Oct. 27, 1936. J. A. LA CLAIR 2,059,000
AUTOMOBILE BUMPER
Filed April 3, 1936 2 Sheets-Sheet 1
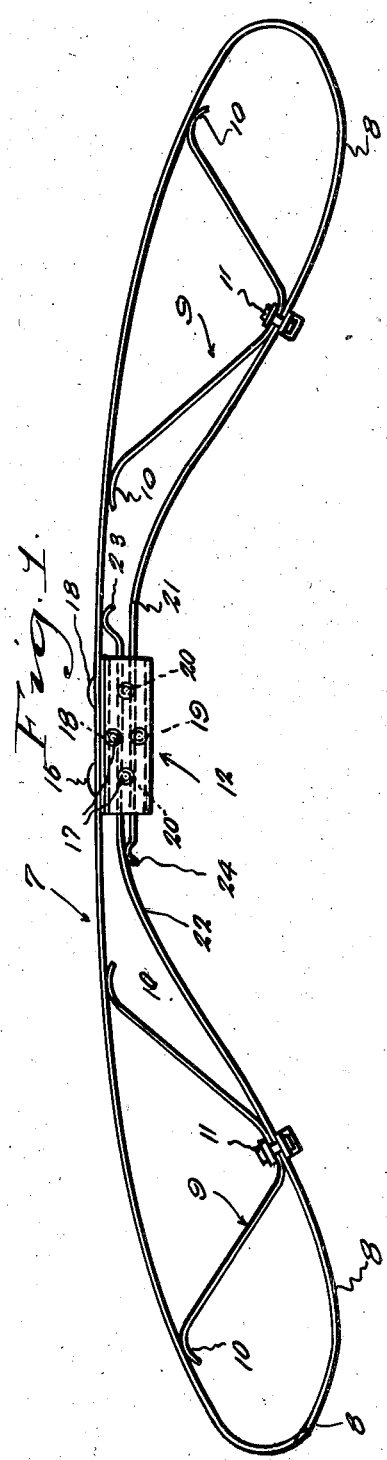
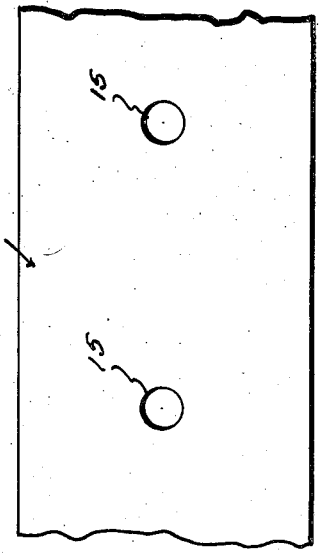
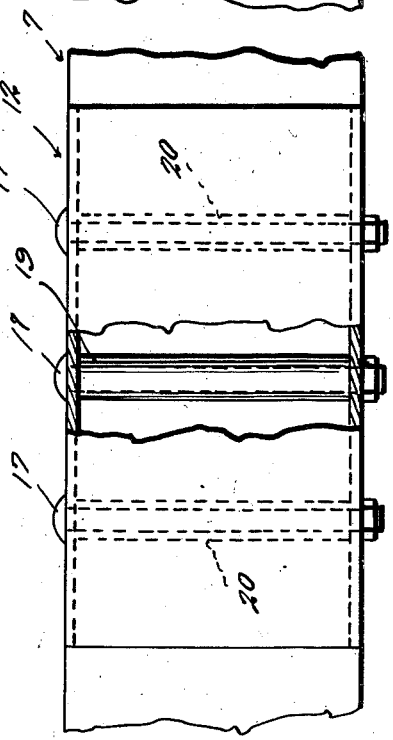
Inventor
Joseph A. La Clair
By Clarence A O'Brien and
Hyman Berman
Attorneys Oct. 27, 1936.   J. A. LA CLAIR   2,059,000
AUTOMOBILE BUMPER
Filed April 3, 1936   2 Sheets-Sheet 2
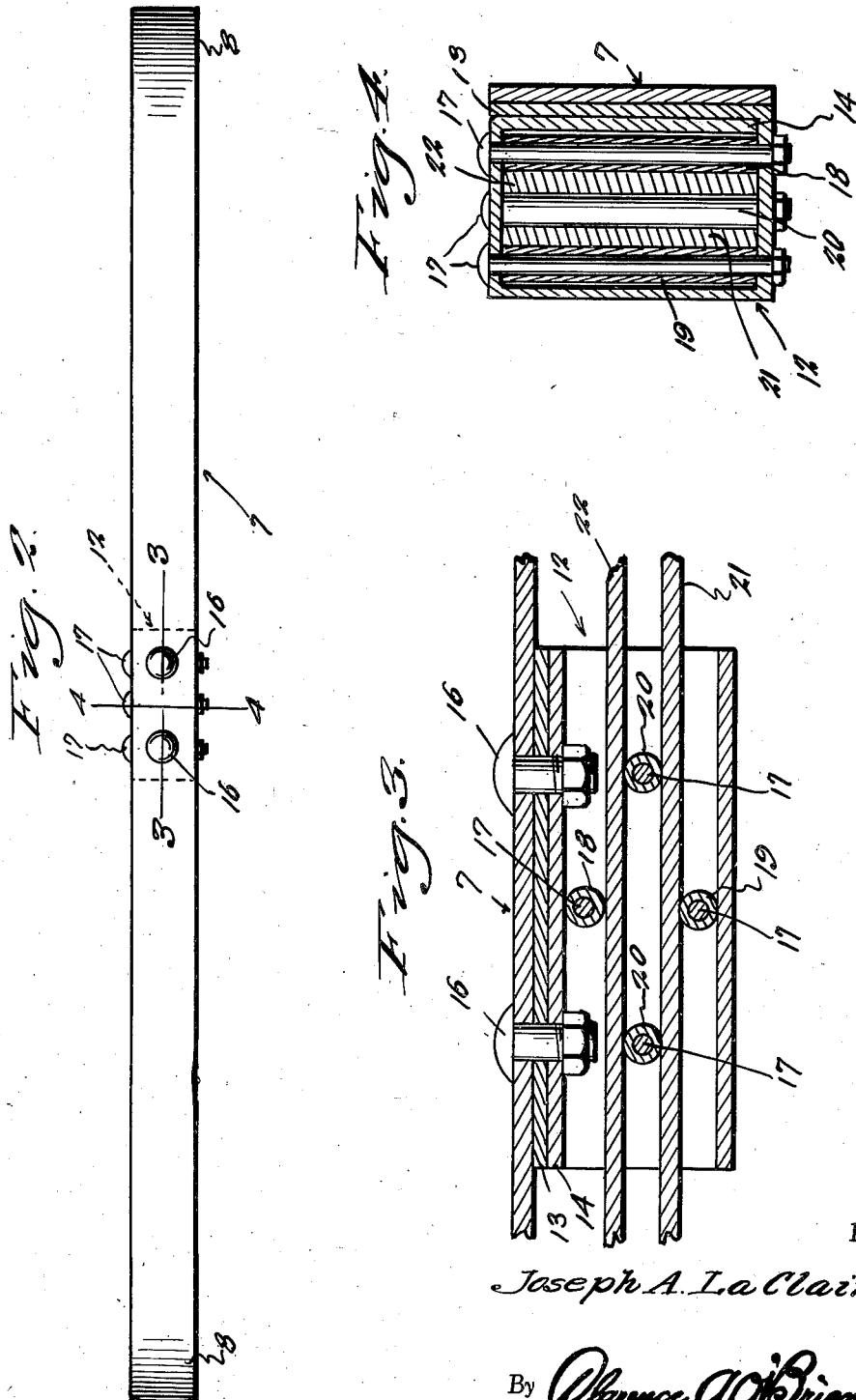
Inventor
Joseph A. La Clair
By Clarence A. O'Brien and
Hyman Berman  Attorneys Patented Oct. 27, 1936

2,059,000

UNITED STATES PATENT OFFICE 2,059,000

AUTOMOBILE BUMPER

Joseph A. Laclair, Detroit, Mich.

Application April 3, 1936, Serial No. 72,615

2 Claims. (Cl. 293—55)

This invention relates to what is believed to be an improved automobile bumper possessing appreciable and noteworthy structural refinements and improvements calculated to permit it to satisfactorily accomplish the purposes and results desired.

Needless to say, I am aware that the particular field to which the invention relates is reasonably well developed and that the present invention, as an additional contribution thereto, is possessed of limited attributes and structural distinctions. Admittedly, however, there is room for a comparatively new adaptation, and influenced with the desire to perfect a bumper construction to the utmost degree, I offer herewith a unitary assemblage characterized by efficient compensating features calculated to render the structure aptly fitted to cope with minor collisions.

The outstanding object, and therefore the gist of the invention, is devoted to a structure wherein the major part is of one piece formation and designed so that its looped end portions constitute independently yieldable elliptical springs, and wherein special adapter means is embodied to provide desired flexation and pressure-resistant properties.

Other features and advantages will become more readily apparent from the following description and drawings.

In the accompanying drawings, wherein like numerals are employed to designate corresponding details throughout the views:

Figure 1 is a top plan view of an automobile bumper designed and perfected in accordance with the inventive principles of my individual conception;

Figure 2 is a front view thereof, that is, a view observing the structure as it would appear from the front of an automobile;

Figures 3 and 4 are enlarged detail sections taken on the planes of the lines 3—3 and 4—4, respectively, of Figure 2;

Figure 5 is an enlarged detail view of the adapter sheath utilized to accommodate the slidable complemental or companion ends of the one-piece band-type main bumper unit, portions being broken away and shown in section;

Figure 6 is a view of the especially apertured frontal portion of the bumper proper.

The bumper proper is formed from a single length or band of steel and is denoted by the numeral 7 and is of appropriate dimensions and tensile strength. It is selected to embody the desired inherent resilient characteristics and properties capable of resisting ordinary impact. The return bends at the opposite ends are bent into what may be called miniature elliptical springs 8. Contained in each spring unit 8 is a substantially V-shaped resistor spring 9 having its laterally bent, outwardly flared end portions fashioned into shoes 10 to ride in slidable contact with the main stretch of the bumper. The apex portion of the spring is suitably fastened to the return bend 8, as indicated at the point 11.

I next call attention to the rectangular sleeve-like adapter sheath or fixture 12. This is formed from a strap of metal which is bent upon itself into box-like form with the free end portions 13 and 14 brought together in overlapping contact, indicated for example in Figures 3 and 4. These portions 13 and 14 are formed with apertures which register with bolt holes 15 formed in the main bumper to accommodate the bolt and nut devices 16. This provides a simple and effective way of maintaining the members 13 and 14 assembled and attaching the box, as a unit, to the bumper. Mounted in this sheath are vertical properly located bolts. There are four of them and they are each designated by the numerals 17. They are so arranged, however, to accommodate rollers and for sake of distinction the rollers are differentiated by the numerals 18, 19, and 20.

It will be observed from Figure 3 that the two rollers 20 are in longitudinal alignment, and that intervening between these are the spaced-apart outer and inner rollers 18 and 19. This grouping of rollers constitutes a predetermined arrangement to accommodate the distinguishable overlapping slidable ends 21 and 22, as shown in Figure 1. These ends terminate in what may be called bends or curls 23 and 24, which are in effect sliding shoes and which contact the parts shown to insure uniform distribution of stress and strain, and to promote free relative sliding. The shoes are located beyond the ends of the accommodation sheath or guide. The ends 21 and 22 extend through the sheath so that they work freely between the respective sets of rollers 18, 19, and 20. It is thus that I provide a satisfactory compensating jointing device between the free ends 21 and 22 which arrangement is desirable in promoting the requisite expansible and contractible properties of the structure as a whole.

Structurally stated, novelty is thought to reside in the one-piece main duplex spring-equipped bumper unit 7 formed from a single strap or band of steel having its end portions formed with return bends to define elliptical springs having cushioning supplementary springs 9 associated therewith. More important novelty and distinction, however, is attached to the provision of the adapter fixture or sheath 12 which constitutes sleeve-like adapter for the relatively slidable end portions 20, 21, and 22 of the main bumper. Then, too, the features 23 and 24 constituting slidable shoes, add to the compensating properties of the structure. Of equally important advantage, however, is the anti-friction roller assembly contained in the sheath to accommodate the slidable free ends 21 and 22. All of these features, however, contribute their proportionate share to the development of a satisfactory bumper possessing shock-absorbing qualities sufficient to overcome easy breakage from minor collisions. It follows, therefore, that the bumper is a novel adaptation in this particular line of endeavor and calculated to promote safer driving.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. An automobile bumper comprising a single length of resilient metal having its ends bent upon themselves and directed inwardly toward each other to define compressible and expansible elliptical springs, said ends being disposed in overlapping relation, a plurality of spaced apart guide rollers secured at an intermediate portion of the bumper and between which said ends are inserted, means on said end portions preventing withdrawal from the rollers during flexing action of the bumper and a V-shaped spring member contained in each elliptical spring having its apex portion fastened permanently to the intermediate portion of the return bend and having its diverging end portions fashioned to provide self-adapting stabilizing shoes and contacting the opposite sides of the elliptical spring at a point inwardly of said diverging end portions.

2. A bumper, an open-ended tubular adapter sheath carried by said bumper, said bumper having inturned end portions slidably mounted in said sheath, and said sheath being provided with a plurality of anti-friction rollers disposed in spaced apart staggered relation and between which the ends of the bumper are inserted and offset portions on said ends of the bumper to prevent withdrawal thereof from the rollers during flexing action of the bumper.

JOSEPH A. LACLAIR.